Figure 1:
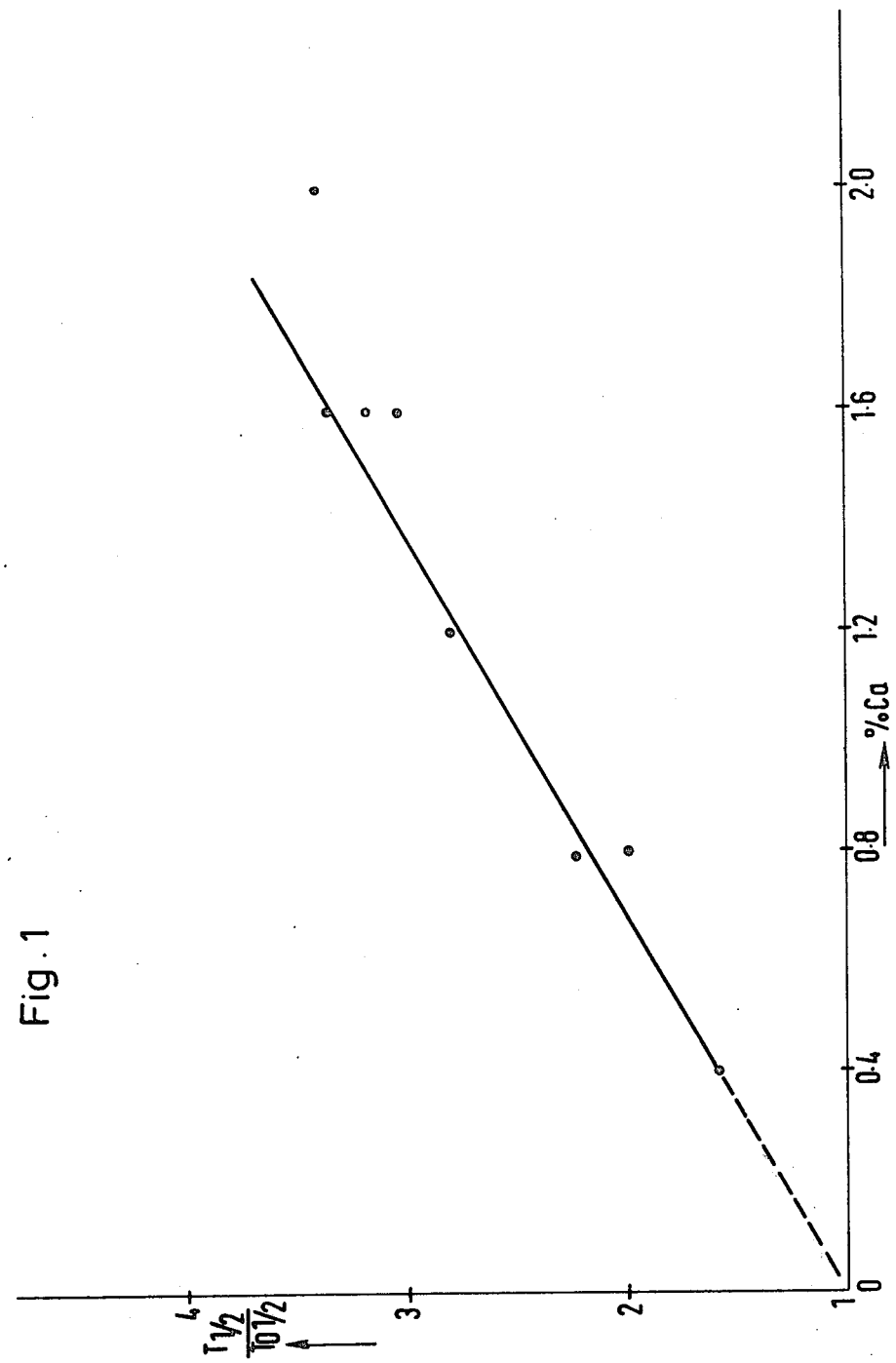

United States Patent [19]

Melles

[11] 4,128,491
[45] Dec. 5, 1978

[54] SLOW-DISSOLVING PERBORATE

[75] Inventor: Leo W. A. Melles, Vlaardingen, Netherlands

[73] Assignee: Lever Brothers Company, New York, N.Y.

[21] Appl. No.: 846,085

[22] Filed: Oct. 27, 1977

[30] Foreign Application Priority Data

Nov. 1, 1976 [GB] United Kingdom ............... 45343/76

[51] Int. Cl.$^2$ ........................... C11D 7/54; C11D 7/56
[52] U.S. Cl. ................................... 252/95; 252/99; 252/135; 252/186; 423/582; 423/583
[58] Field of Search .................... 252/95, 99, 135, 186; 423/582, 583

[56] References Cited

U.S. PATENT DOCUMENTS

| | | | |
|---|---|---|---|
| 3,305,310 | 2/1967 | Schecter et al. | 252/186 X |
| 3,459,665 | 8/1969 | Schiefer et al. | 252/95 |
| 3,639,248 | 2/1972 | Moyer et al. | 252/186 |
| 3,920,803 | 11/1975 | Boryta | 423/579 |
| 3,953,354 | 4/1976 | Faust | 252/187 H |
| 3,983,254 | 9/1976 | Alterman et al. | 428/403 |
| 3,992,317 | 11/1976 | Brichard et al. | 252/186 |

FOREIGN PATENT DOCUMENTS

| | | | |
|---|---|---|---|
| 2225252 | 12/1972 | Fed. Rep. of Germany | 252/95 |
| 962242 | 6/1950 | France | 252/95 |

Primary Examiner—P.E. Willis, Jr.
Attorney, Agent, or Firm—Kenneth F. Dusyn; James J. Farrell; Melvin H. Kurtz

[57] ABSTRACT

A particulate alkali metal perborate having an outer layer of chemically bound calcium in an amount of from about 0.4 to 2.0% by weight of the total particle, to slow down the rate of dissolution. A process for preparing said slow-dissolving perborate.

The slow-dissolving perborate is especially designed for mixing with detergent granules and has improved resistance against catalase attack under practical use conditions.

6 Claims, 1 Drawing Figure

SLOW-DISSOLVING PERBORATE

This invention relates to slow-dissolving perborate, especially designed for mixing with detergent granules and to a process for preparing said perborate.

Alkali metal perborates, like any other peroxyhydrates, have hydrogen peroxide enclosed in their crystal lattice, which is liberated on dissolution. The use of alkali metal perborates as bleaching agents in detergent compositions is well known in the art. Sodium perborate, particularly sodium perborate tetrahydrate, is the most commonly used perborate for admixing with detergent compositions.

The amount of perborate in detergent compositions generally comprises from 10 to 35% by weight of the total composition, though lower amounts have also been employed.

Sodium perborate in the amounts mentioned above is contained in most heavy duty detergent compositions for use in household washing machines in addition to surface-active agents and builder salts which may be present in the approximate proportions of respectively 5–40% by weight and 5–50% by weight of the total composition.

Most washing machines, particularly in Europe, take in cold water, wherein the detergent composition is dissolved, which water is then heated in the machine either to a predetermined temperature or for a predetermined time. Hence a large part of a machine hot-wash cycle is at temperatures lower than about 70° C. Hydrogen peroxide, of which perborate is a source, only bleaches really effectively at temperatures higher than 70° C., and consequently has very little bleaching contribution in the early stages of a machine hot wash cycle. On most laundry articles, particularly soiled clothes, there resides the enzyme catalase, originating from secretions or being of bacterial origin. This enzyme is known to catalyse very effectively the decomposition of peroxy hydrates or hydrogen peroxide at low temperatures up to 60° C. to gaseous oxygen.

The result of the presence of this enzyme is that a large part of the perborate present in the detergent composition is decomposed early in the wash cycle so that, depending on the catalase level in the soiled laundry articles, little or very little perborate remains by the time the high temperatures are reached, with a resultant loss in bleaching effect.

It has been suggested to avoid this loss by adding the perborate to the washing solution at a temperature of about 60° C., at which temperature the catalase has been deactivated, as described in Canadian Pat. No. 806,067. This method would involve separate packs of perborate and detergent composition, which is not only felt as an inconvenience to the consumer but also creates practical dosing problems with the present washing machine constructions.

It was also suggested to use perborate which has been coated with an insoluble organic material, such as fatty acids, waxes, and triglycerides, which disperses or melts in the wash solution at about 60° C., thereby releasing the bleaching agent. The disadvantage of such coating is that in general a high proportion of inert material is introduced and also that insoluble heavy particles are obtained of a size which is generally larger than the granulometry of the perborate used, which particles will sink to the bottom of the washing machine, possibly remaining there unused during the whole wash-cycle.

Another disadvantage is that under misuse conditions of washing, especially in a 60° C. wash-cycle, undissolved coating material may deposit upon the clothes and is not removed therefrom at the end of the wash.

It has further been suggested as described in Canadian Pat. No. 806,068 to use chemical compounds, which deactivate catalase, so-called catalase-deactivating compounds. A major drawback of this method is that most of the effective compounds were found to be of highly toxic nature, which prevents their practical use in detergent compositions.

Since the catalase problem is quite complex, for which so far a completely satisfactory solution has not been found, the invention will not pretend to have found the perfect solution. However, it is an object of the present invention to provide a method for slowing down the rate of dissolution of alkali metal perborates, thereby increasing their resistance against catalase attack under practical use conditions.

It is another object of the invention to provide a slow-dissolving perborate having increased resistance to catalase in the wash.

It has now been found that alkali metal perborates can be made more stable and more resistant to catalase attack without the above drawbacks by providing the particles thereof with an outer layer of chemically bound calcium, which slows down the rate of dissolution.

The process according to the invention comprises treating the perborate particles with an aqueous solution of a relatively water-soluble calcium salt, such as $CaCl_2$, having a concentration of from about 20% to 40% by weight. About 30% calcium salt solutions are normally used.

In one embodiment of the invention the perborate is immersed in the calcium salt solution, stirred for about 20–60 seconds, after which the mixture is filtered to recover the perborate, followed by an aqueous wash and drying.

In another embodiment of the invention the process comprises spraying the perborate with an appropriate amount of the calcium salt solution. The spraying process can be carried out in any suitable mixing apparatus provided with a spraying device, either batchwise or continuously, e.g. in a rotating drum, a rotating plate granulator or using a fluidised bed system. Also a normal soap crutcher provided with a spraying device can be used.

Though the exact mechanism has not been fully understood, it is believed that by the calcium treatment according to the invention the known reaction takes place at the particle surface of the perborate between said perborate and the calcium salt, forming a less soluble calcium compound, which immediately precipitates in situ, thus forming a chemically bound thin calcium layer or coating around the particle, which on analysis seems to comprise a mixture of calcium perborate and calcium metaborate.

Apparently this layer causes a reduction of the dissolution rate of the alkali metal perborate, which reduction rate, as will be appreciated, is dependent upon the thickness of the calcium layer, in other words the amount of chemically bound calcium at the outer surface.

Though the process of the invention makes use of the known conversion of sodium perborate to calcium perborate with a relatively water-soluble calcium salt, it does not contemplate to prepare calcium perborate, but uses it to provide a thin layer of chemically bound calcium around the alkali metal perborate particle surface to slow down the dissolution rate of the perborate only to such an extent that it will not detrimentally affect the suitability of the alkali metal perborate for incorporation in detergent compositions under normal practical conditions.

Hence the calcium-treated alkali metal perborate according to the invention as a matter of fact still comprises very largely alkali metal perborate and behaves as such, unlike the true calcium perborate known in the art.

It is therefore important when carrying out the process of the invention to take care that the reaction is not proceeding too far and converting unnecessarily high proportions of alkali metal perborate into calcium perborate.

Advantageously the particulate alkali metal perborate of the invention should have an outer layer comprising about 0.4–2.0% by weight of calcium, based on the total product.

Accordingly the invention provides a particulate perborate having a reduced rate of dissolution, comprising an alkali metal perborate, the particles of which are provided with an outer layer of chemically bound calcium, wherein the amount of calcium present is from about 0.4 to 2.0% by weight of the total particle.

This condition can be achieved by using a concentration of between 20% and 40% of the calcium salt solution and by watching the immersion time in the immersion process which should lie between 20–60 seconds.

In the spray process, which is the preferred method of the invention, the amount of sprayed calcium solution can be adjusted to meet the above conditions.

Though any alkali metal perborate, including potassium perborate and ammonium perborate, can be used in the present invention, the present treatment can be most advantageously applied to slow down the rate of dissolution of sodium perborate, most commonly used in practice.

The particle size of the alkali metal perborate is not critical and in fact any of the commercial qualities of alkali metal perborate having mean particle sizes of from about 0.04–0.50 mm can be used.

For satisfactory results the spray process is preferably carried out in two stages comprising a first spray with a concentrated calcium salt solution and a second spray with water in an amount approximately equal to the amount of calcium salt solution. In the practice of the invention $CaCl_2$ has been found most convenient for preparing the calcium salt solution. Other calcium salts, though not preferred, provided they are of sufficient solubility, may as desired be used.

Hence in a further preferred embodiment of the invention the process comprises the steps of spraying onto particulate sodium perborate a calcium chloride solution of a concentration of 20–40% by weight, subsequently followed by a spray of water.

The mechanism of this two-stage spray process may be understood from the reaction of $CaCl_2$ with sodium perborate ($NaBO_3$).

It has been observed that sodium perborate, when added to a $CaCl_2$ solution, first dissolves. Solid sodium perborate even dissolves for about 2.3% in a 30% $CaCl_2$ solution at 20° C. This solubility is then quite as high as in water; the molar ratio $$\frac{Na_2B_2O_6}{CaCl_2} = 0.03$$

Continued addition results in the formation of a fine precipitate. When the addition is reversed and 30% $CaCl_2$ solution has been added to an aqueous saturated (2.5%) sodium perborate solution, the calcium compound precipitates immediately. On continued addition the precipitate will dissolve in the end in an excess $CaCl_2$ at a molar ratio of about 0.5.

The effect may be pH-dependent. The $CaCl_2$ solution has a pH of about 6, the perborate solution a pH of about 11.

It is possible that a compound X is formed which dissolves in the $CaCl_2$ solution from the following reaction:

$$CaCl_2 + Na_2B_2O_6 \xrightarrow{pH \leq 7} X \tag{1}$$

When during the first stage concentrated $CaCl_2$ is sprayed on solid perborate, the outer layer of the particles dissolves. The pH in the liquid film is then about 7, as was measured with pH paper. Shortage of water apparently is an obstacle for further reaction. Particles in this stage of the process dissolve when they are dispersed in water substantially as fast as untreated perborate.

Subsequent addition of water in the second stage is accompanied by dissolution of sodium perborate, increase of pH and formation of calcium perborate, which precipitates apparently to a great extent on the particle surface.

It is not certain whether reaction (1) will be followed by a consecutive reaction (2):

$$X + Na_2B_2O_6 \xrightarrow{pH \geq 10} CaB_2O_6 \downarrow + NaCl \text{ or} \tag{2}$$

that there is a competing reaction (3) which is faster than (1):

$$CaCl_2 + Na_2B_2O_6 \xrightarrow{pH \geq 10} CaB_2O_6 \downarrow + 2 NaCl. \tag{3}$$

When diluted $CaCl_2$ is sprayed in one stage, the pH is practically immediately above 10.

There are two possibilities:
Reaction (2) takes place as soon as some X has been formed or reaction (3) occurs.

Whatever the exact reaction mechanism may be, the conclusion is the same; in both cases the concentration of X will be low, and apparently the existence of X is essential for the adhesive process of $CaB_2O_6$ on the crystal lattice.

The presence of some impurities, such as Fe or Cu in the $CaCl_2$ used does not seem to influence the coating, but process temperature does seem to have some influence on the coating quality, which may be due to solubility differences, though in practice a process temperature varying from about 0°–35° C. can be employed with good results.

The treated perborate is quite stable and can be stored for months without losing its reduced dissolution properties.

A convenient way of determining the dissolution behaviour of the product according to the invention is by measuring the "half life time" of dissolution from the change of electrical conductivity, using the following method:

TEST METHOD

1. Use a beakerglass of 500 ml (8 cm diam.; 10 cm height provided with water jacket and connected with a water thermostat).
2. Add 250 ml distilled water and adjust the temperature.
3. Install electrical conductivity cell, Philips Rw 9512, so that the element is at least 3 cm below the water surface, and connect the cell via conductivity meter Type Radiometer CDM 2 to a recorder.
4. Stir with magnetic stirrer at such a high rate that a vortex of 2 or 3 cm exists, and that no particles will settle on the bottom.
5. Pour 2.5 grams perborate into the water.
6. Observe the signal on the recorder chart and continue reading till the conductivity reaches a constant level. Determine on the chart what time corresponds with 50% of the maximum reading.
7. Repeat the measurement with the coated material.
8. The ratio of the half life-times of dissolution of coated against uncoated perborate is a measure for the effectiveness of the coating.

The reduction of the dissolution rate is then expressed as the ratio of the "half life time of dissolution of treated perborate ($T \frac{1}{2}$)" to the "half life time of dissolution of untreated perborate ($To \frac{1}{2}$)", i.e.:

$T \frac{1}{2}/To \frac{1}{2}$ (= half life time ratio of dissolution).

The slow-dissolving perborate according to the invention can be mixed with any detergent composition and can be used either alone as a replacement for non-treated perborate or in admixture therewith in all sorts of detergent compositions including those comprising an enzyme, without detrimental effect. It can further be applied in cases where a slower rate of dissolution of perborates is required.

The invention therefore includes the use of said slow-dissolving perborate in any type of detergent compositions.

EXAMPLE I 10 kg batches of sodium perborate were treated with $CaCl_2$ in a two-stage spray process using a 30% by weight $CaCl_2$ solution in varying amounts.

The half life time ratio of dissolution ($T \frac{1}{2}/To \frac{1}{2}$) as a function of % Ca is plotted in FIG. 1.

From this Figure it can be seen that the optimum effect was reached at about 1.6% Ca. At 2.0% Ca there is only a relatively small increase in effect. Below 0.4% Ca the half life time ratio is practically 1, approaching untreated sodium perborate.

EXAMPLE II 10 kg batches of sodium perborate were treated in a series of experiments with $CaCl_2$ in a two-stage spray process using in the first stage 1.5 kg of 30% by weight $CaCl_2$ solution and in the second stage 1.5 kg of water, giving a perborate having a calcium content of 1.6% by weight.

Various qualities of $CaCl_2$ were used, the solutions being sprayed at varying temperatures.

The half life time ratios $T \frac{1}{2}/To \frac{1}{2}$ are tabulated below.

TABLE 1

| Exp. No. | $CaCl_2$ quality | Process temp. °C | $\frac{T \frac{1}{2}}{To \frac{1}{2}}$ |
|---|---|---|---|
| 2a | p.a. | 5 – 15 | 3.0 |
| 2b | p.a. | 5 – 15 | 3.3 |
| 2c | p.a. | 5 – 15 | 3.1 |
| 2d | p.a. | 20 – 26 | 2.2 |
| 2e | p.a. | 30 – 26 | 1.9 |
| 2f | Techn. 1* | 20 – 25 | 2.3 |
| 2g | Techn. 2* | 20 – 25 | 2.1 |
| 2h | Techn. 3* | 20 – 25 | 2.2 |
| 2j | Techn. 4* | 20 – 25 | 2.0 |
| 2k | Techn. 5* | 20 – 25 | 2.5 |

| | | impurities (mg/kg) | |
|---|---|---|---|
| | % $CaCl_2$ | Cu | Fe |
| *Techn. 1 | 82/85 | 0.3 – 0.6 | <1 |
| Techn. 2 | 95/98 | 0.6 | 3 |
| Techn. 3 | 96/98 | — | — |
| Techn. 4 | 77 | 0.9 | <1.5 |
| Techn. 5 | 84 | 0.6 | <1.5 |

$T \frac{1}{2}/To \frac{1}{2}$ values of experiments No. 2a–2e were determined at 25° C.; those of experiments 2f–2k were determined at 21° C.

EXAMPLE III

This example shows the influence of a 4 months' storage of treated perborate on the half life time ratio of dissolution ($T \frac{1}{2}/To \frac{1}{2}$).

TABLE 2

| | at 25° C | $\frac{T \frac{1}{2}}{To \frac{1}{2}}$ | at 22° C |
|---|---|---|---|
| Exp. No. | initially | | after 4 months |
| 3 (a) | 3.30 | | 3.70 |
| 3 (b) | 3.12 | | 3.80 |
| 3 (c) | 1.56 | | 2.50 |
| 3 (d) | 2.78 | | 4.00 |
| 3 (e) | 3.33 | | 4.30 |

The above results show that no disintegration of the outer layer occurs during storage.

EXAMPLE IV

Washing experiments were carried out in a drum type washing machine (Philips HN 3111) with 100 g of a base powder of the following nominal composition in which 20% sodium perborate tetrahydrate was incorporated:

| Composition | Parts by weight |
|---|---|
| Alkyl benzene sulphonate | 7.0 |
| Tallow alcohol-25 ethylene oxide condensate | 1.5 |
| Tallow alcohol-11 ethylene oxide condensate | 1.0 |
| Sodium stearate | 4.0 |
| Sodium triphosphate | 36.0 |
| Sodium silicate | 6.0 |
| Sodium carboxymethyl cellulose | 0.7 |
| Ethylene diamine tetraacetate | 0.12 |
| Sodium sulphate | 8.0 |
| Fluorescers + water | 10.0 |

Comparisons of the bleaching results were on tea-stained cloth were made in clean systems with and without added catalase (C-1064 ex Sigma Chemical Company) and with treated and untreated sodium perborate. The machine was programmed at maximum temperature main wash.

The results are tabulated below.

TABLE 3

|  | No catalase | | 1 mg $l^{-1}$ catalase | |
| --- | --- | --- | --- | --- |
|  | Active oxygen yield at 80° C (g $l^{-1}$) | ΔR | Active oxygen yield at 80° C (g $l^{-1}$) | ΔR |
| Untreated sodium perborate | 0.9 | 14.8 | 0.25 | 7.5 |
| Treated sodium perborate A | 0.89 | 15.0 | 0.37 | 10.5 |
| Treated sodium perborate B | 0.82 | 15.0 | 0.56 | 12.3 |

Treated perborates A-B were prepared by spraying a $CaCl_2$ solution on 10 kg sodium perborate tetrahydrate specified as follows:

|  | 1st step (g) | | 2nd step (g) | Temp. (° C) | | $\frac{T\frac{1}{2}}{To\frac{1}{2}}$ |
| --- | --- | --- | --- | --- | --- | --- |
|  | $CaCl_2$ | Water | water | liquid | product before drying | |
| A | 445 | 1055 | 1500 | 1 | 12 | 3 |
| B | 445 | 1055 | 1500 | 0 - 5 | 15 | 3.33 |

The above results clearly show that the slow-dissolving perborate of the invention offers advantages over normal sodium perborate in catalase active systems.

I claim:

1. Particulate alkali metal perborate having a reduced rate of dissolution, especially designed for mixing with detergent granules, the particles of which have an outer layer comprising calcium perborate and calcium metaborate wherein the amount of calcium present is from 0.4% to 2.0% by weight of the total particle.

2. A process for preparing a slow-dissolving perborate of claim 1, comprising contacting an alkali metal perborate with a $CaCl_2$ solution having a concentration of 20-40% by weight.

3. A process for preparing a slow-dissolving perborate of claim 1, comprising contacting the alkali metal perborate with a relatively water-soluble calcium salt solution having a concentration of 20-40% by weight.

4. A process according to claim 3, wherein the alkali metal perborate is immersed in the $CaCl_2$ solution, stirred for 20-60 seconds, the mixture is filtered and the recovered solid perborate is subjected to an aqueous wash.

5. A process according to claim 3, wherein the $CaCl_2$ solution is sprayed on to the alkali metal perborate which is held in constant motion in an amount sufficient to give a calcium content of 0.4% to 2.0% by weight of the perborate.

6. A process according to claim 5, wherein the alkali metal perborate is subsequently treated with a water spray in an amount approximately equal to the amount of $CaCl_2$ solution.

* * * * *